(12) United States Patent
Hochberg et al.

(10) Patent No.: US 9,924,247 B2
(45) Date of Patent: *Mar. 20, 2018

(54) OPTICAL PAIRED CHANNEL TRANSCEIVER AND SYSTEM

(71) Applicant: Elenion Technologies, LLC, New York, NY (US)

(72) Inventors: Michael Hochberg, New York, NY (US); Bernd-Harald Horst Jurgen Rohde, Munich (DE)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/420,645

(22) Filed: Jan. 31, 2017

(65) Prior Publication Data

US 2017/0142504 A1 May 18, 2017

Related U.S. Application Data

(63) Continuation of application No. 14/856,909, filed on Sep. 17, 2015, now Pat. No. 9,596,033, which is a (Continued)

(51) Int. Cl.
*H04B 10/40* (2013.01)
*H04Q 11/00* (2006.01)
*H04J 14/06* (2006.01)

(52) U.S. Cl.
CPC ......... *H04Q 11/0005* (2013.01); *H04B 10/40* (2013.01); *H04J 14/06* (2013.01); (Continued)

(58) Field of Classification Search
CPC ..... H04B 10/40; H04J 14/06; H04Q 11/0005; H04Q 2011/0016; H04Q 2011/0018; H04Q 2011/0035
(Continued)

(56) References Cited

U.S. PATENT DOCUMENTS 6,580,516 B1 * 6/2003 Tucker ............... G01J 3/26
356/519
2004/0114867 A1 * 6/2004 Nielsen ............... G02F 1/011
385/40
(Continued)

FOREIGN PATENT DOCUMENTS

EP 2773052 A1 9/2014

OTHER PUBLICATIONS

European Patent Office, International Search Report and Written Opinion of International Searching Authority for PCT/US2016/052390 dated Jan. 10, 2017 (14 pages total).
(Continued)

*Primary Examiner* — Dalzid Singh
(74) *Attorney, Agent, or Firm* — Nixon Peabody LLP

(57) ABSTRACT

An optical paired channel transceiver component comprises an optical channel interface to concurrently receive an inbound optical signal at a designated receiver frequency, and output an outbound optical signal at a designated transmitter frequency distinct from the receiver frequency; a receiver operable to process the inbound optical signal at the receiver frequency; a laser input interface to receive a laser input at the transmitter frequency to produce the outbound optical signal; and a resonant optical structure optically coupling each of the laser input interface and the receiver to the optical channel interface via respective optical paths, and having a resonance corresponding to one of the transmitter frequency and the receiver frequency such that a resonant one of the inbound signal and the outbound signal is resonantly redirected by the resonant optical structure along a resonant one of the respective paths.

16 Claims, 8 Drawing Sheets

Related U.S. Application Data continuation-in-part of application No. 14/832,377, filed on Aug. 21, 2015.

(60) Provisional application No. 62/040,233, filed on Aug. 21, 2014.

(52) U.S. Cl.
CPC .......... *H04Q 2011/0016* (2013.01); *H04Q 2011/0018* (2013.01); *H04Q 2011/0035* (2013.01)

(58) Field of Classification Search
USPC .......................................................... 398/46
See application file for complete search history.

(56) References Cited

U.S. PATENT DOCUMENTS

| | | | | |
|---|---|---|---|---|
| 2006/0198401 A1* | 9/2006 | Suzuki | ............... | G02B 6/12007 372/20 |
| 2011/0069963 A1* | 3/2011 | McLaren | ........... | G02B 6/12007 398/115 |
| 2013/0183044 A1* | 7/2013 | Stone | .................... | H04B 10/40 398/139 |
| 2014/0328590 A1* | 11/2014 | Brenot | .................. | H04B 10/40 398/42 |
| 2016/0057517 A1* | 2/2016 | Coca | .................. | H04Q 11/0005 398/49 |
| 2016/0209724 A1* | 7/2016 | Testa | ....................... | G02F 1/313 |

OTHER PUBLICATIONS

Chin, M. "Polarization dependence in waveguide-coupled microresonators"; Optics Express, vol. 11, No. 15; Jul. 28, 2003, pp. 1724-1730; XP055328722; ISSN: 2161-2072; DOI: 10.1364/OE. 11.001724 (7 pages).

Anon.; "Optical Heterodyne Detection"; RP Photonics Encyclopedia, Jul. 2, 2014, XP002765163; retrieved from the Internet: https://web.archive.org/web/20150402134058/http://www.rp-photonics.com/optical_heterodyne_detection.html; retrieved on Dec. 7, 2016 (6 pages).

Klunder, D. et al.; "A Novel Polarization-Independent Wavelength-Division-Multiplexing Filter Based on Cylindrical Microresonators"; IEEE J. Selected Topics in Quantum Electronics, vol. 8, No. 6; Nov./Dec. 2002; pp. 1294-1299; XP55328722A (6 pages).

\* cited by examiner

OPTICAL PAIRED CHANNEL TRANSCEIVER AND SYSTEM

CROSS-REFERENCE TO RELATED APPLICATIONS

This application is a continuation of U.S. patent application Ser. No. 14/856,909, filed Sep. 17, 2015, now allowed, which is a continuation-in-part of and claims priority to U.S. patent application Ser. No. 14/832,377, filed Aug. 21, 2015, which claims the benefit of U.S. Provisional Application No. 62/040,233, filed Aug. 21, 2014, each of which is hereby incorporated by reference herein in its entirety.

FIELD OF THE DISCLOSURE

The present disclosure relates to optical transceivers, and, in particular, to an optical paired channel transceiver and system.

BACKGROUND

Coherent optical paired channel systems are known, for example in coherent optical Metro communication systems, in which a single laser can be used both for upstream transmission and as a local oscillator source for coherent downstream reception. FIG. 1 provides a schematic representation of the general principle and spectrum involved in such a system, generally referred to using the numeral 100. As shown in FIG. 1, the system generally includes a first tunable laser 102 for producing a first transmission or upstream signal 104 via a first transceiver 106, and a second tunable laser 108 for producing a second transmission or downstream signal 110 via a second transceiver 112. Each of the upstream and downstream signals will co-propagate on a same paired channel in opposite directions for respective coherent detection at the second and first transceivers 112 and 106, respectively. An optical fiber 114 of the system 100 is used bi-directionally; that is, the same fiber is used in both the downstream and upstream directions to propagate respective upstream 104 and downstream signals 110. As each optical transceiver 106, 112 consists of a transmitter and a receiver, the optical paths of both units have to be combined onto the single optical bi-directional fiber 114. While upstream and downstream separation on a single optical fiber has been accomplished using fixed band pass filters or optical circulators, each of these approaches generally suffers from one or more significant drawbacks.

For example, band pass filters used for this purpose were generally either realized as thin film filters or by doping glass such that the dopant causes the glass to absorb the light above a certain wavelength. Those realizations are not tunable and have a wide spectral transition region; the separation of two spectrally close wavelengths cannot be performed with such devices.

Circulators, on the other hand, can work for the separation of spectrally close or identical upstream and downstream wavelengths, but their integration into monolithic photonic circuits is not readily achievable at the time being due to fundamental physical reasons. Additionally, as circulators are spectrally wide-band, unwanted light which comes from back reflections from the fiber or back fiber connectors, for example, can pass through the circulator and ultimately cause distortions.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for an optical paired channel transceiver and system that overcome some of the drawbacks of known techniques, or at least, provides a useful alternative thereto. Some aspects of this disclosure provide examples of such transceivers and systems.

In accordance with one such broad aspect, there is provided an optical paired channel transceiver component comprising: an optical channel interface to concurrently receive an inbound optical signal at a designated receiver frequency, and output an outbound optical signal at a designated transmitter frequency distinct from the receiver frequency; a receiver operable to process the inbound optical signal at the receiver frequency; a laser input interface to receive a laser input at the transmitter frequency to produce the outbound optical signal; a resonant optical structure optically coupling each of the laser input interface and the receiver to the optical channel interface via respective optical paths, and having a resonance corresponding to one of the transmitter frequency and the receiver frequency such that a resonant one of the inbound signal and the outbound signal is resonantly redirected by the resonant optical structure along a resonant one of the respective paths, whereas the other non-resonant one of the inbound signal and the output signal is concurrently directed substantially unperturbed by the resonant optical structure along a non-resonant one of the respective paths.

In one embodiment, the resonance corresponds to the receiver frequency such that the inbound optical signal is resonantly redirected by the structure toward the receiver, whereas the outbound optical signal is directed substantially unperturbed by the structure toward the channel interface. In one such embodiment, the structure is a tunable resonant optical structure, wherein a tuning thereof is dynamically adjustable to optimize the receiver frequency, and wherein the transceiver further comprises a receiver frequency controller operable to adjust the tuning to maintain constant a frequency difference between a local oscillator of the receiver and the receiver frequency.

In one embodiment, the resonance corresponds to the transmitter frequency such that the outbound optical signal is resonantly redirected by the structure toward the interface, whereas the inbound optical signal is directed substantially unperturbed by the structure toward the receiver.

In one embodiment, the structure is a tunable resonant optical structure tuned so to correspond with the one of the transmitter frequency and the receiver frequency. In one such embodiment, the transceiver further comprises a photodetector operable to detect an optical intensity in one of the resonant path and the non-resonant path, wherein the tunable optical structure is dynamically tunable responsive to the optical intensity so to optimize the optical intensity.

In one embodiment, the structure comprises at least one of a ring resonator and a Fabry-Perot resonator.

In one embodiment, the structure comprises two or more parallel resonant optical structures.

In one embodiment, the structure comprises two or more serially coupled resonant optical structures.

In one embodiment, the transceiver further comprises a polarization rotator optically coupled between the interface and the optical structure to rotate an inbound polarization of the inbound optical signal to correspond with an outbound polarization of the outbound optical signal such that both the inbound optical signal and the outbound optical signal interact with the resonant optical structure at a substantially same polarization. In one such embodiment, the transceiver further comprises a polarization beam splitting component aligned with the outbound polarization and disposed so to redirect a perpendicularly polarized portion of the inbound optical signal to a photodetector, wherein a photodetector output is used to control the polarization rotator in optimizing a rotated polarization of the inbound signal to minimize the photodetector output.

In one embodiment, the transceiver further comprises an on-chip laser operable to provide the laser input at the laser input interface.

In one embodiment, the transceiver further comprises an outbound signal modulator operatively coupling the outbound optical signal into the resonant optical structure. In one such embodiment, wherein the modulator and the receiver are operatively integrated with the resonant optical structure within a single-chip configuration.

In one embodiment, the transceiver further comprises a polarization beam splitting component splitting the inbound optical signal into first and second polarization-dependent inbound components so to have substantially parallel and perpendicular polarizations to an outbound polarization of the outbound signal, respectively; the receiver comprises first and second coherent heterodyne receivers respectively operable to coherently process respective ones of the first and second inbound components; the optical structure comprises first and second resonant optical structures to interface with respective ones of the first and second inbound components in relaying them to the first and second receivers, respectively; the transceiver further comprises a polarization rotator rotating the second inbound component prior to input into the second resonant optical structure so to align the perpendicular polarization with the outbound polarization such that both the second inbound component and a component of the outbound optical signal interact with the second resonant optical structure at a substantially same polarization.

In one embodiment, the transceiver further comprises: a polarization beam splitting component splitting the inbound optical signal into a first and a second polarization-dependent inbound component having a first and a second polarization, respectively, wherein the first polarization is substantially parallel to an outbound polarization of the outbound signal; a polarization rotator rotating the second polarization-dependent inbound component so to align the first and the second polarization; a polarization combiner combining the first and the second inbound component prior to their combined optical coupling into the resonant optical structure.

In one embodiment, the transceiver further comprises at least one polarization splitting and rotating component such that both the inbound optical signal and the outbound optical signal interact with the resonant optical structure at a substantially same polarization.

In one embodiment, the transceiver is monolithically integrated within a photonic device.

In one embodiment, the resonant optical structure concurrently filters out unwanted spectral components of the resonant one of the inbound signal and the outbound signal as a result of being resonantly redirected by the resonant optical structure along the resonant path.

In one embodiment, the laser input further provides a local oscillator for the receiver in processing the inbound optical signal.

In one embodiment, the receiver comprises a coherent heterodyne receiver.

In one embodiment, the receiver comprises a coherent heterodyne receiver and the transceiver comprises a distinct laser input to provide a local oscillator to the receiver.

In one embodiment, the transceiver is further operable to produce distinctly polarized outbound optical signals at the transmitter frequency from the laser input.

In one embodiment, the transceiver further comprises one or more optical amplifiers to amplify at least one of the outbound and the inbound optical signal.

In accordance with another embodiment, there is provided a coherent optical paired channel transceiver comprising: an optical fiber interface to receive an inbound optical signal at a designated receiver frequency, and output an outbound optical signal at a designated transmitter frequency distinct from the receiver frequency; a coherent heterodyne receiver operable to coherently process the inbound optical signal at the receiver frequency; a laser input interface to receive a laser input tuned at the transmitter frequency to produce the outbound optical signal and provide a local oscillator for the receiver; a ring resonator having a ring waveguide disposed between opposed first and second linear waveguides, wherein the ring resonator is tuned to correspond with the receiver frequency such that the inbound signal, when optically coupled into the first waveguide from the interface, is resonantly redirected via the ring waveguide along the second linear waveguide for optical coupling with the receiver, whereas the outbound signal is relayed substantially unperturbed by the ring waveguide while propagating along the first waveguide toward the interface.

In one embodiment, the transceiver further comprises a photodetector operable to detect an outbound optical intensity directed toward the interface, wherein the ring resonator is dynamically tunable to maximize the optical intensity.

In one embodiment, the ring resonator comprises two or more ring resonators optically coupled in at least one of in series and in parallel.

In one embodiment, the transceiver further comprises a polarization rotator optically coupled between the interface and the ring resonator to rotate an inbound polarization of the inbound optical signal to correspond with an outbound polarization of the outbound optical signal such that both the inbound optical signal and the outbound optical signal interact with the ring resonator at a substantially same polarization.

In one embodiment, the transceiver further comprises a polarization controller disposed so to redirect a perpendicularly polarized portion of the inbound optical signal to a photodetector, wherein an output of the photodetector is used to control the polarization controller in optimizing a rotated polarization of the inbound signal to minimize the photodetector output.

In one embodiment, the transceiver further comprises an outbound signal modulator operatively coupling the outbound optical signal into the ring resonator, wherein the transceiver consists of a monolithically integrated photonic transceiver.

In one embodiment, the transceiver further comprises an on-chip laser operable to provide the laser input at the laser input interface.

In one embodiment, the transceiver further comprises a hybrid laser having an on-chip portion integrally formed to optically couple with the laser input interface, and an off-chip portion that, when optically coupled with the on-chip portion, form a laser cavity of the hybrid laser.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

The systems and methods described herein provide, in accordance with different embodiments, different examples of an optical paired channel transceiver and system, each one using one or more lasers for transmission and as local oscillator for coherent reception, while using a tunable micro-ring resonator, or other interference-based optical structure, for upstream (outbound) and downstream (inbound) separation. Using the general design principles introduced herein, shortcomings introduced above with respect to current paired channel systems can be overcome or at least improved upon. For instance, and as will be described in greater detail below, the designs considered herein may be subject to monolithic integration, as can they be used in the separation of two spectrally close wavelengths. Furthermore, while the embodiments illustrated herein as examples provide for a single paired-channel transceiver on a given chip configuration, multiple paired-channel transceivers may also be implemented on a single chip, and that, without extending beyond the general scope and nature of the present disclosure. Likewise, different components may be implemented on or off-chip, such as an on or off-chip laser input(s), outbound signal modulator(s), inbound signal receiver(s), and the like.

For example, one embodiment provides an optical coherent paired channel heterodyne transceiver having a tunable ring resonator structure used as a combiner/separator element for the upstream and downstream components of the paired channel system. In some embodiments, this transceiver can be implemented in an integrated configuration using silicon photonics, for example, in a single chip or dual chip configuration. As will be described in greater detail below with reference to alternative embodiments, such as that illustrated in FIG. 8, other interference-based optical structures may be considered to provide similar results and advantages over the state of the art. For instance, while the examples of FIGS. 2-7 concentrate on the implementation of coherent paired channel transceiver systems operable via the introduction of one or more resonant optical structures (e.g. ring resonators) configured to optically couple each of a laser input interface and a receiver to a paired channel interface via respective resonant and non-resonant optical paths, the provision of other interference-based optical structures, as will be detailed below, can also be used as an alternative to optically couple each of the laser input interface and the receiver to the paired channel interface via respective constructive interference and destructive interference optical paths.

Figure 1:
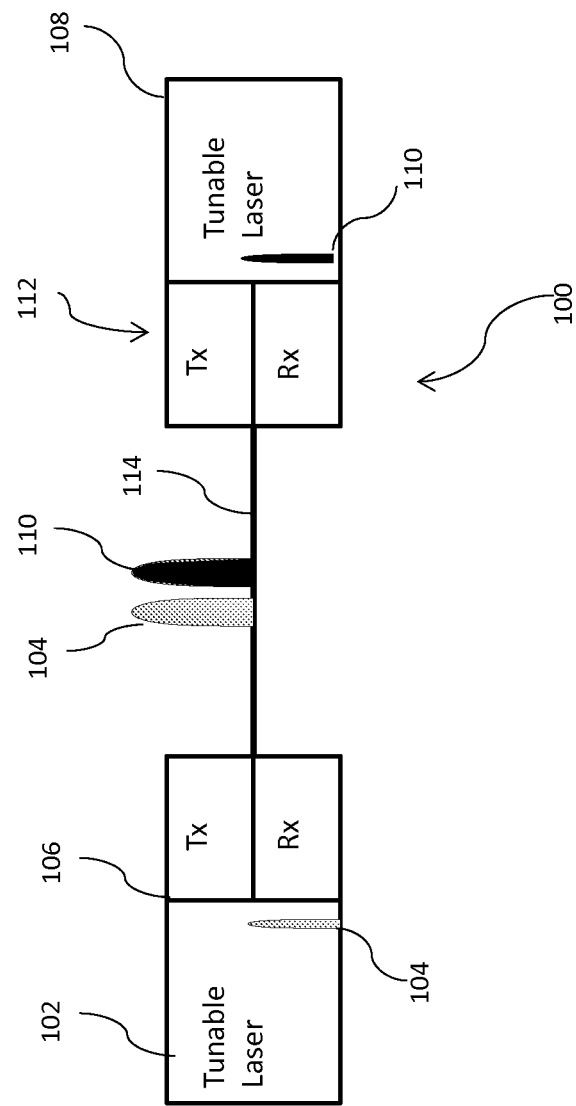
FIG. 1 is a schematic diagram of a basic principle and spectrum involved in coherent optical paired channel transceivers and systems.
Figure 2:
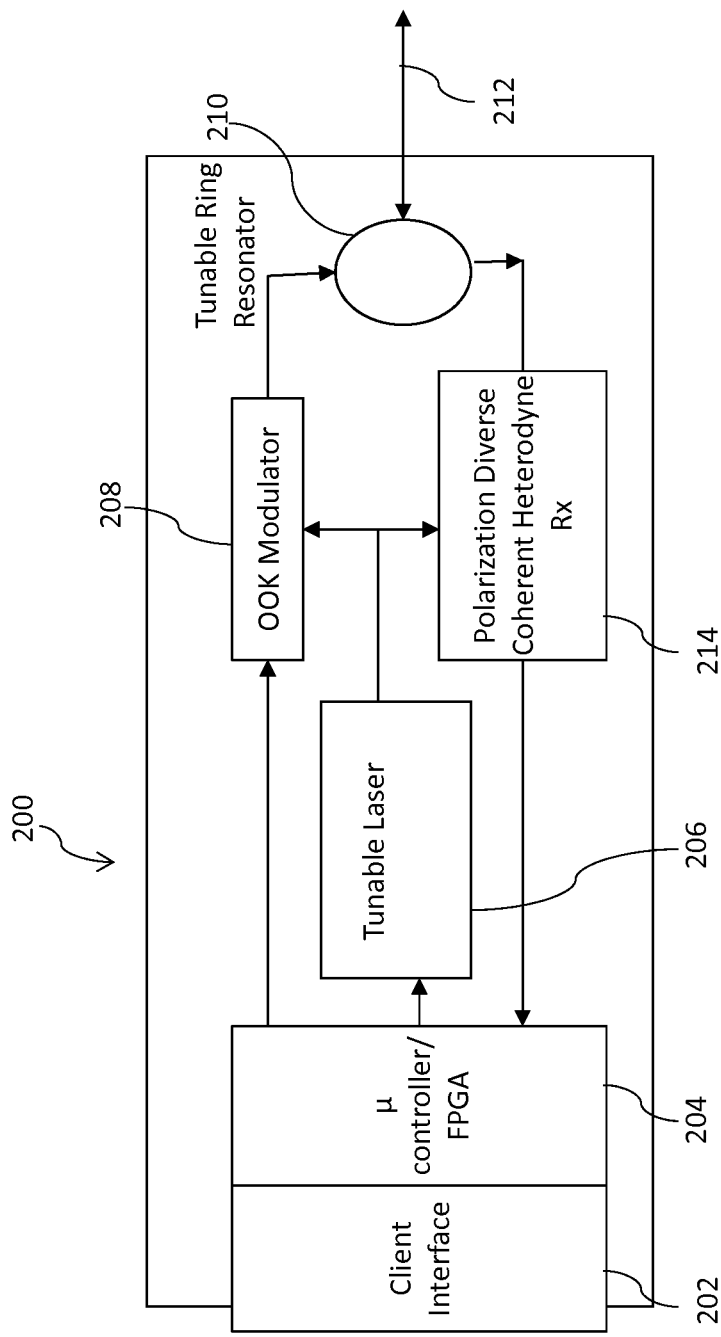
FIG. 2 is a high level block diagram of a coherent optical paired channel transceiver having a micro-ring resonator, in accordance with one embodiment.

With reference now to FIG. 2, and in accordance with one embodiment, a coherent paired channel transceiver system, generally referred to using the numeral 200, will now be described. In this embodiment, the transceiver generally comprises a client interface 202 and microcontroller/FPGA 204 controlling output of a tunable laser 206 to be used both as light source for upstream (outbound) communication transmission and as a local oscillator for coherent reception of downstream (inbound) communications. Alternatively, a distinct laser could be used as local oscillator for coherent reception. Likewise, while the embodiment of FIG. 2 schematically illustrates the laser 206 as forming part of the transceiver 200 for illustrative purposes, the laser 206 may be equally provided on or off-chip, as well as in the provision of a hybrid laser implementation. For example, an on-chip portion of the laser may be integrally formed on-chip (e.g. Si chip) to optically couple with a laser input interface to the modulator and/or receiver, while an off-chip portion, e.g. forming part of a distinct chip (e.g. III/V chip), can be optically coupled therewith in operation to form a laser cavity of this hybrid laser configuration.

For the purposes of transmission, the laser output is first modulated by an on-off keying (OOK) modulator 208, or the like, itself controlled by the microcontroller 204 to apply a designated transmission signal modulation in producing the outbound optical signal. As will be appreciated by the skilled artisan, different types of modulation may be considered as alternatives to the OOK modulator illustrated in FIG. 2. For example, different modulation formats such as, but not limited to, phase modulation (e.g. PSK) and M-aryl Amplitude-Phase Modulation (e.g. M-QAM) may be considered without departing from the general scope and nature of the present disclosure. Likewise, different modulator types such as, but not limited to, Mach-Zehnder Modulators (MZM), Electroabsorption modulators, resonant modulators, and the like, may also be utilized to achieve similar results.

In this embodiment, the modulated transmission signal is tuned so to propagate substantially off-resonance and thus substantially unperturbed by a micro-ring resonator 210 to be ultimately output for transmission on a paired channel fiber 212 via an appropriate optical interface thereto (e.g. fiber plugin or other optical couplings).

A downstream signal inbound on the paired channel fiber 212 is, however, substantially in tune for substantial resonant coupling into the ring resonator 210, thereby redirecting the downstream optical signal, in this example, to a polarization diverse coherent heterodyne receiver 214.

As noted above, given this configuration, the same laser 206 can be used as a local oscillator input to the receiver 214 for coherent reception of the inbound signal to be processed by the microcontroller 204. For instance, in the context of the system of FIG. 2, and those described below with reference to FIGS. 5, 6 and 7, the close frequencies of the transmitter and receiver can allow for the same laser to be used both as light source for upstream communication transmission and as a local oscillator for coherent reception of downstream communications, for example via the coherent heterodyne receiver 214 illustrated in this example. As commonly known in the art, in heterodyne detection, a signal of interest at some frequency, in this case the inbound optical signal, is non-linearly mixed with a reference local oscillator that is set at a close-by frequency, in this case the source transmitter signal. The desired outcome is the difference frequency, which carries the information (amplitude, phase, and frequency modulation) of the signal of interest. In one embodiment, the ring resonator tuning may be dynamically adjusted so to dynamically maintain a substantially constant frequency difference between the local oscillator and the inbound signal, the frequency of the later being effectively selected by micro-ring tuning.

In accordance with other embodiments, alternative receivers may be implemented, such as for example, but not limited to, direct amplitude modulated receivers, balanced receivers, and the like, without departing from the general scope and nature of the present disclosure.

Figure 3:
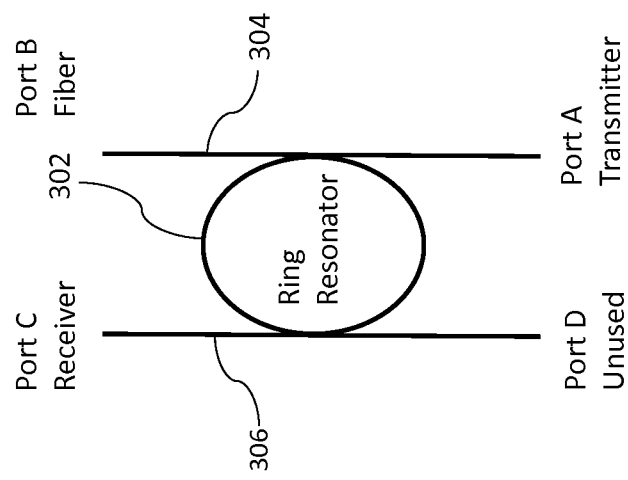
FIG. 3 is a schematic diagram of a micro-ring resonator usable in the transceiver of FIG. 2 and identifying various ports and connections therefor.

In FIG. 3, a schematic illustration of a usable ring resonator configuration is shown, in which a ring waveguide 302 is nested between a first 304 and a second 306 linear waveguide on either side. Resonant light is coupled into and out of the resonance ring 302 by evanescent coupling, the distances between the waveguides 304, 306 and the resonator 302 determining the coupling constants. In some embodiments, wavelength tuning of the resonator can be performed by heating the device, thus changing the optical path lengths and therefore the resonance frequencies. Other options for tuning include carrier manipulation in either forward or reverse bias mode, as well as the use of capacitive effects.

With added reference to the embodiment of FIG. 2, the modulated transmission signal is input at port A of the first waveguide 304 and propagates along this first waveguide 304 substantially off-resonance and thus unperturbed by the ring resonator 302 to exit at port B via optical coupling to the paired channel fiber 212. The inbound signal arriving at port B via optical coupling from the paired channel fiber 212, being substantially resonant with the ring resonator 302, resonantly couples into the ring resonator 302 to travel along its circular path and ultimately resonantly couple into the second waveguide 306 to travel toward port C, which is itself optically coupled to the receiver 214. In this example, port D is marked as unused, however, this port could alternatively be used for monitoring purposes, as will be readily appreciated by the skilled artisan.

Figure 4:
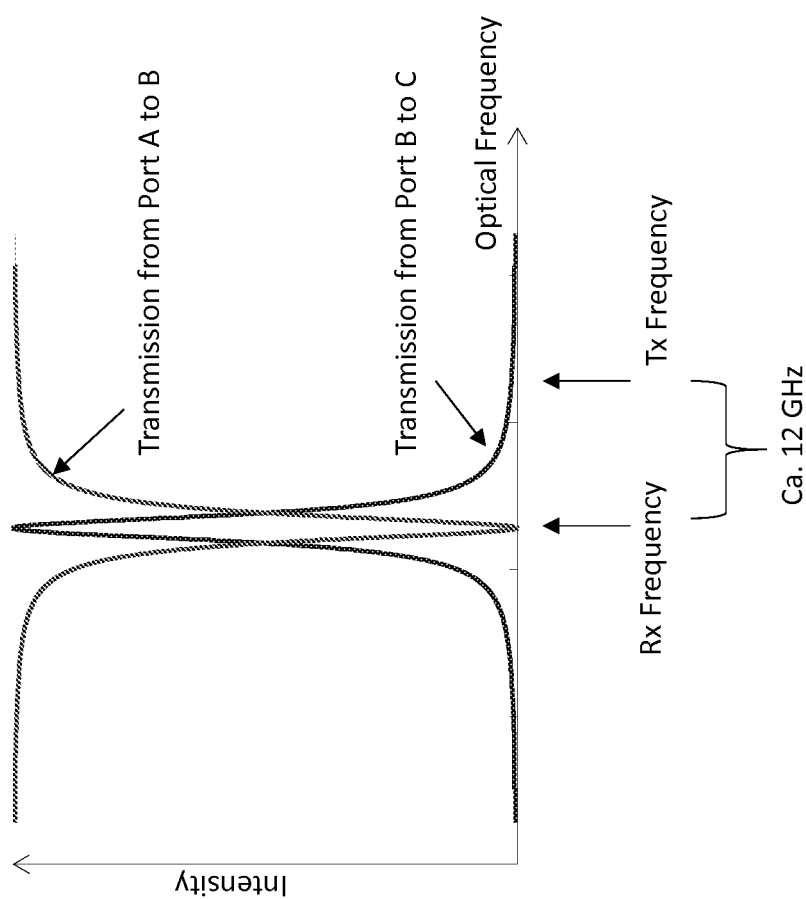
FIG. 4 is a plot exemplifying a spectral behaviour of the micro-ring resonator of FIG. 3.

For illustrative purposes, the general spectral behavior of the ring resonator configuration of FIG. 3 is shown in FIG. 4. As noted above, depending on the optical frequencies, wavelengths are either transmitted straight through the waveguides or routed through the resonator. With proper tuning and resonator design, the resonator can be used such that the transmitted light passes straight through the waveguide to the fiber, while the received light is routed to the receiver port. For instance, in the example shown in FIG. 4, the ring resonator 302 is tuned in substantial resonance with a receiver optical frequency (Rx Frequency) of inbound optical signals on the fiber at port B such that a transmission intensity for such inbound optical signals from Part B (optical fiber) to Port C (optical receiver) is maximized, whereas a transmitter optical frequency (Tx Frequency) is sufficiently offset from the Rx Frequency (e.g. at least 1.2 times the symbol rate in some embodiments) so to substantially bypass the ring resonator 302 and thereby maximize an outbound transmission intensity from Port A (Transmitter) to Port B (optical fiber).

While a single ring resonator is used in the above examples, a further implementation may consist instead in the use of cascaded tunable ring resonators. For example, two or more resonators can be cascaded in a parallel and/or serial configuration to achieve similar results. Accordingly, the person of ordinary skill in the art will appreciate that while the various illustrative embodiments described herein are illustrated to include a single ring resonator, any of these embodiments may alternatively encompass two or more cascading ring resonators, and that, without departing from the general scope and nature of the present disclosure. Furthermore, other alternative resonators may be considered to provide a similar effect, such as linear Fabry-Perot Resonators, Bragg Gratings, and the like.

Further, as will be appreciated by the skilled artisan, the ring resonator port allocations may be alternated to achieve a similar result. Namely, the ring resonator could otherwise be tuned in resonance with the outbound transmission signal so to have this outbound signal enter the ring resonator on a first waveguide to optically couple into and out of the circular waveguide for output via a second waveguide leading to the paired channel fiber, whereas an inbound signal of slightly offset frequency simply propagates along this second waveguide in an opposite direction substantially unperturbed by the ring waveguide for direct processing by the receiver.

In one embodiment, the transceiver may be implemented in a photonic integrated circuit (PIC). Where different material systems are preferred or must be used due to different physical reasons (e.g. Silicon and Indium Phosphide), similar systems may also be implemented via dual or multi-chip configurations. These systems may also be realized with discrete components, albeit with the expectation of larger implementation sizes and higher coupling losses. Generally, they can be implemented via various PIC technologies, such as, but not limited to, Silicon Photonics, Indium Phosphide or Silicon on Insulator.

Figure 5:
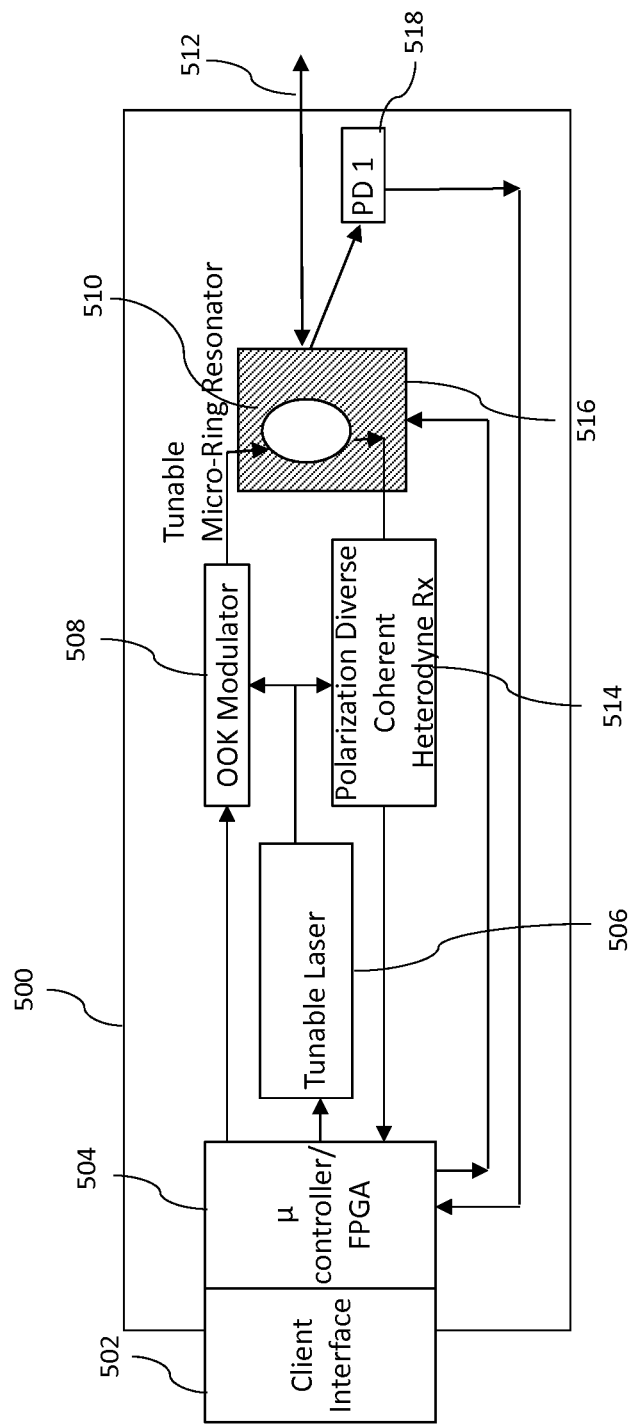
FIG. 5 is a block diagram of a coherent optical paired channel transceiver system having a micro-ring resonator and control loop therefor, in accordance with one embodiment.

In one embodiment, the ring resonator 302 is tuned to maximize the transmitter light output at the fiber, for example via direct feedback control. With reference to FIG. 5, and in accordance with one illustrative embodiment, an alternative coherent paired channel transceiver system, generally referred to using the numeral 500, will now be described. Again, the transceiver generally comprises a client interface 502 and microcontroller/FPGA 504 controlling output of a tunable laser 506 to be used both as light source for upstream communication transmission and as a local oscillator for coherent reception of downstream communications. Alternatively, a distinct laser could be used as local oscillator for coherent reception. Likewise, the laser 506 may be equally provided on or off-chip, as well as in the provision of a hybrid laser implementation, for example as described above. For the purposes of transmission, the laser output is first modulated by an on-off keying modulator 508, or the like, itself controlled by the microcontroller 504 to apply a designated transmission signal modulation. In this embodiment, the modulated transmission signal is tuned so to propagate substantially off-resonance and thus substantially unperturbed by a micro-ring resonator 510 to be ultimately output for transmission on a paired channel fiber 512.

An downstream signal inbound on the paired channel fiber 512 is, however, again substantially in tune for substantial resonant coupling into the ring resonator 510, thereby redirecting the downstream optical signal, in this example, to a polarization diverse coherent heterodyne receiver 514.

In this particular embodiment, however, a tuning of the ring resonator 510 is actively controlled by way of a thermal tuner 516, for example, actively connected to the microcontroller 504, which is itself operable to probe a transmitter intensity directed outbound toward the fiber 512 and dynamically adjust a tuning of the resonator 510 to maximize this output. For example, a small part of the transmitted light (e.g. about 5%) can be tapped and detected by the photodiode 518 (PD 1). The micro controller 504 can then evaluate the signal from the photodiode 518 via operative coupling thereto, and generate an appropriate tuning signal for the thermal tuner 516 of the micro ring resonator 510 such that the current on the photodiode 518 is maximized, i.e. such that the output light is maximized.

Generally, the embodiments described above work best when the transmitted and the received light are in the same polarization plane. For instance, micro ring resonators are usually quite polarization-dependent; that is, the waveguide loss generally differs for the two orthogonal polarization planes, resulting in different resonator quality factors for the two polarizations, i.e. different filter curves. Furthermore, and more importantly, the optical path lengths within the ring resonator may also differ for the two polarizations, implying that the spectral positions of the filter responses may also differ for the two polarizations. So to circumvent potential polarization-related concerns, alternative embodiments are described below with reference to FIGS. 6-7, respectively, that can better accommodate polarization diversity. While the below examples focus on the reception of distinctly polarized signals, these or other embodiments (not shown) may also allow for the transmission of distinctly polarized transmission signals, and that, without departing from the general scope and nature of the present disclosure.

Figure 6:
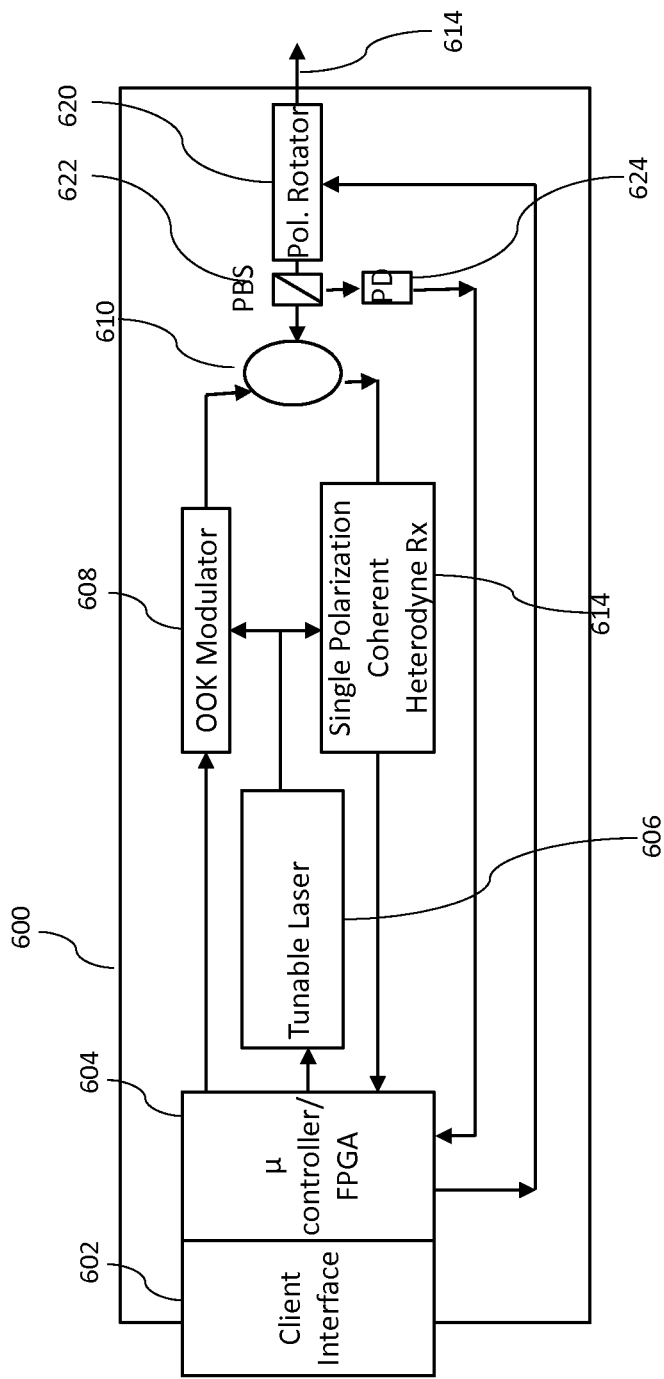
FIG. 6 is a block diagram of a coherent optical paired channel transceiver system having a micro-ring resonator and a polarization rotation function, in accordance with one embodiment.

With reference to FIG. 6, and in accordance with one illustrative embodiment, an alternative coherent paired channel transceiver system, generally referred to using the numeral 600, will now be described. Again, the transceiver generally comprises a client interface 602 and microcontroller/FPGA 604 controlling output of a tunable laser 606 to be used both as light source for upstream communication transmission and as a local oscillator for coherent reception of downstream communications. Alternatively, a distinct laser could be used as local oscillator for coherent reception. Likewise, the laser 806 may be equally provided on or off-chip, as well as in the provision of a hybrid laser implementation, for example as described above. For the purposes of transmission, the laser output is first modulated by an on-off keying modulator 608, or the like, itself controlled by the microcontroller 604 to apply a designated transmission signal modulation. In this embodiment, the modulated transmission signal is tuned so to propagate substantially off-resonance and thus substantially unperturbed by a micro-ring resonator 610 to be ultimately output for transmission on a paired channel fiber 612.

A downstream signal inbound on the paired channel fiber 612 is, however, again substantially in tune for substantial resonant coupling into the ring resonator 610, thereby redirecting the downstream optical signal, in this example, to a single polarization diverse coherent heterodyne receiver 614. Namely, in this particular embodiment, a polarization-rotating device 620 is located in front of the ring resonator 610, which ensures that the whole structure of the transceiver 600 only receives a single polarization plane, thus the single polarization receiver 614. A particular advantage of this design is its reduced complexity in the electrical domain, as no combiner is necessary to combine the signals from the two polarizations. On the other hand, this design generally makes use of a polarization controller, as illustrated in FIG. 6 and described below.

In general, the incoming light passes through the polarization rotator 620, which rotates the polarization such that it is always in the same polarization plane as the transmitted light from the transmitter, i.e. such that both the received and the transmitted light have the same polarization within the ring resonator 610. In order to determine the polarization of the incoming light, an illustrative polarization beam splitter (PBS) 622 aligned with a polarization of the transmission signal output from the ring resonator 610 is located between the micro ring resonator 610 and the polarization rotator 620 (a polarization beam splitter and rotator (PBSR) can be used interchangeably herein to produce the desired function, as will be readily appreciated by the skilled artisan). The polarization component of the incoming light that is perpendicular to the wanted component, i.e. to the local transmitter polarization, is filtered out and detected by a photo diode (PD) 624. The signal of the PD 624 is sent to the microcontroller 604 which, by dithering techniques, delivers the control signals for the polarization rotator 620 such that the signal from the PD 624 is minimized. Accordingly, the inbound signal's polarization is optimally rotated before interfacing with the ring resonator 610, and the outbound signal is effectively rotated before coupling into the paired channel fiber 212 to more or less coincide with a polarization of the inbound signal therein. For the sake of simplicity, the control loop for the micro-ring resonator tuning is not shown in this example, but may be equally applied herein.

Figure 7:
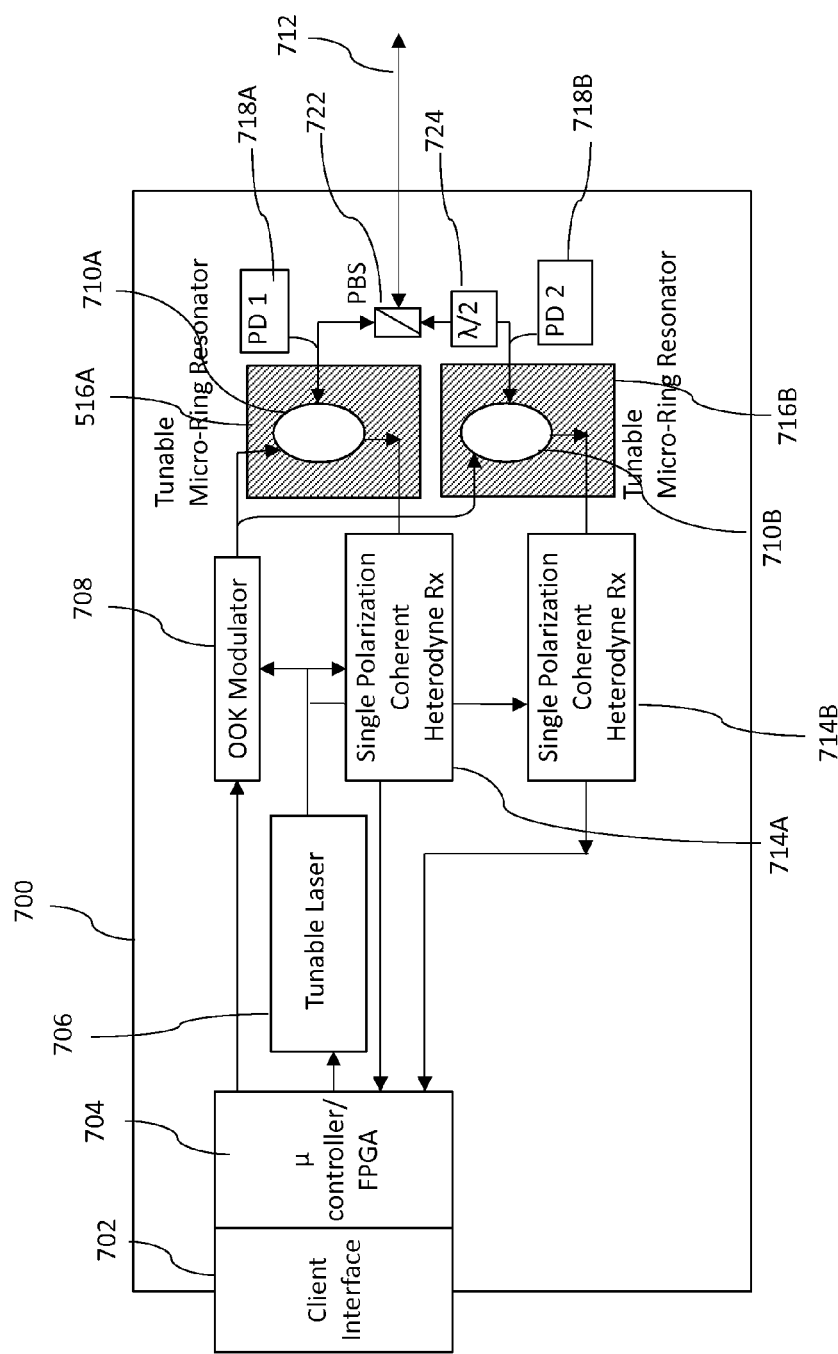
FIG. 7 is a block diagram of a coherent optical paired channel transceiver system having dual micro-ring resonators operable so to provide polarization diversity, in accordance with one embodiment.

With reference to FIG. 7, and in accordance with one illustrative embodiment, an alternative coherent paired channel transceiver system, generally referred to using the numeral 700, will now be described. Again, the transceiver generally comprises a client interface 702 and microcontroller/FPGA 704 controlling output of a tunable laser 706 to be used both as light source for upstream communication transmission and as a local oscillator for coherent reception of downstream communications, in this example, in distinct polarizations. Alternatively, a distinct laser could be used as local oscillator for coherent reception. Likewise, the laser 806 may be equally provided on or off-chip, as well as in the provision of a hybrid laser implementation, for example as described above. For the purposes of transmission, the laser output is first modulated by an on-off keying modulator 708, or the like, itself controlled by the microcontroller 704 to apply a designated transmission signal modulation. In this embodiment, the modulated transmission signal is tuned so to propagate substantially off-resonance and thus substantially unperturbed by each of two micro-ring resonators 710A and 710B operated to address respective polarizations, each to be ultimately output for transmission on a paired channel fiber 712.

A downstream signal inbound on the paired channel fiber 712 is, however, again substantially in tune for substantial resonant coupling into the ring resonators 710A and 710B once respectively split according to polarization, thereby redirecting the downstream optical signal, in this example, to respective single polarization diverse coherent heterodyne receivers 714A and 714B. In this particular embodiment, a polarization-dependent beam splitter 722 is located in front of the ring resonators 710A and 710B, directing a first polarization component to the first resonator 710A, and a second polarization component to the second resonator 710B via a half-wave plate (or equivalent polarization rotating structure) 724, which again ensures that the polarization of this split inbound component is rotated 90-degrees to correspond with the polarization of the transmitter signal, thus allowing both ring resonators to be operated in parallel by covering the same polarization plane.

As shown in the embodiment of FIG. 5, a tuning of both ring resonators 710A and 710B is actively controlled by way of respective thermal tuners 516A and 516B, for example, actively connected to the microcontroller 704, which is itself operable to probe a transmitter intensity outbound from each resonator and dynamically adjust a tuning thereof to maximize their respective output. For example, a small part of the transmitted light (e.g. about 5%) can be tapped and detected by respective photodiodes 518A (PD 1) and 518B (PD 2). The micro controller 504 can then evaluate the signals received from each photodiode via operative coupling thereto (not shown), and generate appropriate respective tuning signals for each thermal tuner 516A, 516B such that the current on the respective photodiodes is maximized, i.e. such that the output light from each resonator is maximized.

As noted above, for the receive side, a polarization beam splitter and rotator (PBSR), schematically illustrated as a PBS 722 and half-wave plate (or equivalent polarization rotating structure) 724 in FIG. 7, can be used between the edge of the chip and the second ring resonator 710B. Then one can use two separate ring resonators to accommodate the two different received polarizations. In an alternative embodiment, an active polarization controller/combiner can be used after the PBSR in order to lock the two received polarizations' phases together, and thus create a single-chain optical train via a single ring modulator. Other configurations may also be considered, as will readily appreciated by the skilled artisan without departing from the general scope and nature of the present disclosure.

As will be appreciated by the skilled artisan, while the above makes regular reference to a PBS, generally speaking, in an integrated system, one may rather use a polarization beam splitter and rotator (PBSR), which takes in TE and TM, and splits out two physically separated TE modes, for instance.

As introduced above, the various embodiments contemplated within the scope of this application may provide various advantages over known techniques. For example, they can be readily integrated in an integrated waveguide platform such as Silicon Photonics or Indium-Phosphide wavers.

Depending on the configuration of the system, optical filtering may be applied to either of the upstream or downstream signal, that is to the signal being redirected by the ring resonator. For example, light may be filtered in the transmit (upstream) direction by virtue of the ring resonator in some configurations such that the spectral components of the modulated light which spread out into the received spectrum are automatically suppressed. This may enhance robustness against back reflections without the need for electrical or optical pulse shaping in the transmitter.

Upstream filtering may additionally suppress laser side modes, thus enhancing the Side Mode Suppression Ratio (SMSR) and enabling the combination of many transceivers onto one fiber without additional filtering.

In other configurations, the light to the receiver may alternatively be filtered within a particularly small spectral region. While such filtering is not required due to the coherent detection scheme considered herein, filtering the receiver path may nonetheless enhance the robustness of the transceiver against high broadband optical input power, and may further relax the Common Mode Rejection Ratio (CMRR) requirements of the balanced photo detectors.

As will be appreciated by the skilled artisan, further filters may be added to the above or related embodiments to better isolate optical channels of interest, and thus improve a performance and efficiency of the disclosed transceivers.

As will be further appreciated by the skilled artisan, various control schemes and configurations may be considered within the present context, generally in combination with various detector-based control loops and the like, to monitor and adjust and optimize system operation.

Furthermore, the provision of one or more amplifiers, such as on-chip or off-chip semiconductor optical amplifiers or the like, may be considered in improving a transmission power and/or a receiver sensitivity of the disclosed transceiver embodiments, and that, without departing from the general scope and nature of the present disclosure.

As noted above, while the above examples focused on the integration of one or more resonant optical structures in optically coupling each of a laser input interface and a receiver to a paired channel interface via respective resonant and non-resonant optical paths, other interference-based optical structures may also be considered to provide similar results, in accordance with alternative embodiments.

Figure 8:
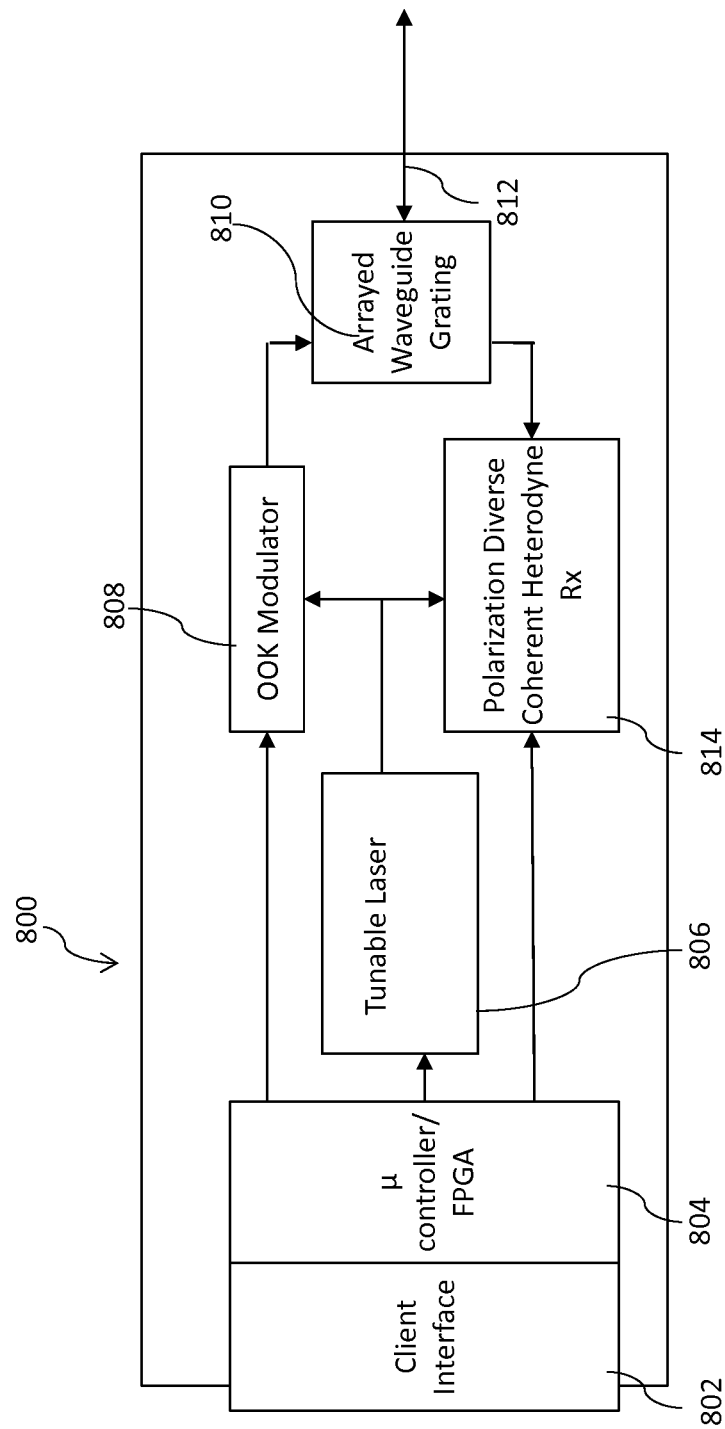
FIG. 8 is a block diagram of a coherent optical paired channel transceiver system having an arrayed wave-guide grating, in accordance with another embodiment.

For example, and with reference to FIG. 8, a coherent paired channel transceiver system, generally referred to using the numeral 800, will now be described in accordance with one such alternative embodiment. The transceiver 800 generally comprises a client interface 802 and microcontroller/FPGA 804 controlling output of a tunable laser 806 to be used both as light source for upstream (outbound) communication transmission and as a local oscillator for coherent reception of downstream (inbound) communications. Alternatively, a distinct laser could be used as local oscillator for coherent reception. Likewise, the laser 806 may be equally provided on or off-chip, as well as in the provision of a hybrid laser implementation, for example as described above. For the purposes of transmission, the laser output is first modulated by an exemplary on-off keying (OOK) modulator 808, or the like, itself controlled by the microcontroller 804 to apply a designated transmission signal modulation in producing the outbound optical signal.

In this embodiment, the modulated transmission signal propagates via constructive interference within a given output channel waveguide of an arrayed waveguide grating 810 to be ultimately output for transmission on a paired channel fiber 812 via an appropriate optical interface thereto (e.g. fiber plugin or other optical couplings). A distinctly tuned downstream signal inbound on the paired channel fiber 812, however, will be subject to constructive interference along a distinct input channel waveguide of the arrayed waveguide grating 810 for coupling into a polarization diverse coherent heterodyne receiver 814, while experiencing destructive interference within the output channel waveguide. Accordingly, the arrayed waveguide grating can act as an effective relay to manage paired channels signals at the transceiver even when such paired channels are operated in close spectral proximity. Similar to the resonance-based embodiments described above, these embodiments are also amenable to single-chip integration, and other such advantages as will be now be readily apparent to the skilled artisan.

As will be appreciated, while the above depicts an interference-based embodiment employing an arrayed waveguide grating, other interference-based optical structures may also be considered, such as, but not limited to, a thin film filter, a reflective or transmissive grating structure (e.g. échelle grating), one or more unbalanced Mach-Zehnder Interferometers (MZI—i.e. multi-arm, nested or treed MZI), and the like.

While the present disclosure describes various exemplary embodiments, the disclosure is not so limited. To the contrary, the disclosure is intended to cover various modifications and equivalent arrangements included within the general scope of the present disclosure.

What is claimed is:

1. An optical transceiver comprising:
    an optical channel interface for receiving an inbound optical signal at a receiver frequency, and output an outbound optical signal at a transmitter frequency distinct from said receiver frequency;
    a receiver operable to process said inbound optical signal at said receiver frequency;
    a light source for generating said outbound optical signal; and
    a tunable wavelength router optically coupling each of said light source and said receiver to said optical channel interface via first and second optical paths;
    wherein one of said inbound signal and said outbound signal is transmitted by said tunable wavelength router to the first optical path, whereas the other one of said inbound signal and said output signal is directed by said tunable wavelength router along said second path; and
    wherein the tunable wavelength router is dynamically adjustable to maximize transmission intensity of one of the inbound and the outbound signal along the first optical path.

2. The transceiver of claim 1, wherein said tunable wavelength router transmits said inbound optical signal towards said receiver such that said tunable wavelength router is tunable to maximize transmission intensity of the inbound optical signal, whereas said outbound optical signal is directed by said tunable wavelength router toward said channel interface along the second optical path.

3. The transceiver of claim 2, further comprising a photodetector operable to detect an optical intensity in said first optical path, wherein said tunable wavelength router is dynamically tunable responsive to said optical intensity to optimize said transmission intensity of the inbound signal.

4. The transceiver of claim 2, wherein the receiver comprises a coherent heterodyne receiver;
    wherein the laser provides a local oscillator for said receiver; and
    wherein the tunable wavelength router is operable to maintain a constant frequency difference between a local oscillator and said receiver frequency.

5. The transceiver of claim 2, wherein said tunable wavelength router comprises a tunable resonant optical structure, capable of dynamic adjustment to optimize said receiver frequency.

6. The transceiver of claim 1, wherein said tunable wavelength router transmits said outbound optical signal to said interface, such that said tunable wavelength router is tunable to maximize transmission intensity of the outbound optical signal, whereas said inbound optical signal is directed by said tunable wavelength filter toward said receiver along the second optical path.

7. The transceiver of claim 6, further comprising a photodetector operable to detect an optical intensity in said first optical path, wherein said tunable wavelength router is dynamically tunable responsive to said optical intensity to optimize said transmission intensity of the outbound signal.

8. The transceiver of claim 7, wherein said tunable wavelength router comprises a tunable resonant optical structure, dynamically adjustable to optimize transmission intensity at said receiver frequency.

9. The transceiver of claim 8, wherein said tunable resonant optical structure concurrently filters out unwanted spectral components of said resonant one of said inbound signal and said outbound signal as a result of being resonantly redirected by said resonant optical structure along said first optical path.

10. The transceiver of claim 8, wherein said tunable resonant optical structure, said receiver, and said laser are integrated on a semiconductor substrate.

11. The transceiver of claim 1, wherein said laser comprises a tunable laser for tuning the transmitter frequency; and wherein the tunable wavelength router dynamically adjusts to the transmitter frequency to maximize output.

12. The transceiver of claim 1, further comprising a polarization rotator optically coupled between said interface and said tunable wavelength router to rotate an inbound polarization of said inbound optical signal to correspond with an outbound polarization of said outbound optical signal such that both said inbound optical signal and said outbound optical signal interact with said tunable wavelength router at a substantially same polarization.

13. The transceiver of claim 12, further comprising a polarization beam splitting component aligned with said outbound polarization and disposed to redirect a perpendicularly polarized portion of said inbound optical signal to a photodetector, wherein a photodetector output is used to control said polarization rotator in optimizing a rotated polarization of said inbound signal to minimize said photodetector output.

14. The transceiver of claim 1, further comprising:
    a polarization beam splitting component splitting said inbound optical signal into first and second polarization-dependent inbound components so to have substantially parallel and perpendicular polarizations to an outbound polarization of said outbound signal, respectively;
    a polarization rotator rotating said second inbound component prior to input to align said perpendicular polarization with said outbound polarization such that both said second inbound component and a component of said outbound optical signal interact with said tunable wavelength router at a substantially same polarization;
    wherein said receiver comprises first and second coherent heterodyne receivers respectively operable to coherently process respective ones of said first and second inbound components; and
    wherein said tunable wavelength router comprises first and second resonant optical structures to interface with respective ones of said first and second inbound components in relaying them to said first and second receivers, respectively.

15. The transceiver of claim 1, further comprising:
- a polarization beam splitting component splitting said inbound optical signal into a first and a second polarization-dependent inbound component having a first and a second polarization, respectively, wherein said first polarization is substantially parallel to an outbound polarization of said outbound signal;
- a polarization rotator rotating said second polarization-dependent inbound component so to align said first and said second polarization;
- a polarization combiner combining said first and said second inbound component prior to their combined optical coupling into said tunable wavelength router.

16. The transceiver of claim 1, further comprising at least one polarization splitting and rotating component such that both said inbound optical signal and said outbound optical signal interact with said tunable wavelength router at a substantially same polarization.

\* \* \* \* \*